(12) United States Patent
Kuramoto

(10) Patent No.: US 8,534,980 B2
(45) Date of Patent: Sep. 17, 2013

(54) SYSTEMS AND METHODS OF LOADING AND UNLOADING A VEHICLE

(76) Inventor: Yoshisuke Kuramoto, Tokyo (JP)

( * ) Notice: Subject to any disclaimer, the term of this patent is extended or adjusted under 35 U.S.C. 154(b) by 168 days.

(21) Appl. No.: 13/186,906

(22) Filed: Jul. 20, 2011

(65) Prior Publication Data

US 2012/0020763 A1  Jan. 26, 2012

(30) Foreign Application Priority Data

Jul. 23, 2010  (JP) .................................. 2010-179023

(51) Int. Cl.
*B60P 1/54* (2006.01)

(52) U.S. Cl.
USPC ............................. 414/542; 212/180; 254/325

(58) Field of Classification Search
USPC .......................... 212/180; 254/325; 414/542
See application file for complete search history.

(56) References Cited

U.S. PATENT DOCUMENTS

| | | | | |
|---|---|---|---|---|
| 3,572,513 | A | * | 3/1971 | Tantlinger et al. ............ 212/180 |
| 4,187,048 | A | * | 2/1980 | Bohlmann .................... 414/542 |
| 4,806,060 | A | * | 2/1989 | Molski .......................... 414/462 |
| 4,930,970 | A | * | 6/1990 | Sunderland ................... 414/542 |
| 5,862,926 | A | * | 1/1999 | Johnson ........................ 212/180 |
| 7,287,948 | B2 | * | 10/2007 | Knoell .......................... 414/546 |
| 8,366,373 | B2 | * | 2/2013 | Wood ............................ 414/543 |
| 2002/0159872 | A1 | * | 10/2002 | Scartelli ........................ 414/542 |

FOREIGN PATENT DOCUMENTS

DE  3307640 A1 * 9/1984  .................... 414/542

* cited by examiner

*Primary Examiner* — James Keenan
(74) *Attorney, Agent, or Firm* — Jackson Patent Law Office

(57) ABSTRACT

Disclosed is system configured to place a load in a motor vehicle. The system includes a beam defining a first end configured to receive the load, and a second end configured to receive a counter force to the load; and a base defining a fulcrum for the beam, such that the second end of the beam receives a constraining force from a ceiling of the vehicle, the constraining force thereby acting as the counter force.

8 Claims, 6 Drawing Sheets

SYSTEMS AND METHODS OF LOADING AND UNLOADING A VEHICLE

BACKGROUND OF THE INVENTION

1. Field of the Invention

This invention relates generally to systems and methods of loading and unloading a vehicle and, more particularly, to an in-car crane product or assembly kit for installing inside vans and station wagons with a cargo hatch door, without having to make modifications such as bolting it to the body of the vehicle, enabling loading and unloading of cargo by one person, safely.

2. Description of Related Art

Loading of cargo that is too heavy to lift by one person can be a problem with vans and station wagons with a roof and a cargo hatch door at the rear of the vehicle, especially when using hoists or cranes mounted outside of the vehicle and the roof interferes the loading, or when there is not even a hoist or a crane. In these cases, assistance from another is required to load the cargo, and, it may lead to accidents such as dropping or pinching of the hands may occur.

Furthermore, unavailability of a method to load and unload a wheelchair by oneself limits the range of activity of the user of the wheelchair.

In-car cranes such as Japan Pat. 2010-47416, Japan Pat. 2004-35238, Japan Pat. Heisei 9-315778, Japan Pat. Heisei 6-56388, Japan Pat. Utility Model Heisei 7-35486, and Japan Pat. Utility Model Heisei 5-35476 have been presented, however, these are all rigid-structured cantilever cranes mounted on truck beds for loading cargo.

Although Japan Pat. Heisei 11-79668 is compact and therefore suitable for installing inside vans and station wagons, it is a rigid-structured rotating cantilever crane where the crane must be bolted on to the floor of the vehicle's body with enough durability because the load and the bending momentum of the cargo concentrates on the attachment on the floor of the vehicle.

SUMMARY OF THE INVENTION

According to an aspect of the present invention, there is a system configured to place a load in a motor vehicle, the motor vehicle including a floor, a ceiling, a rear axle, and wheels linked to each other via the rear axle. The system includes a beam extending longitudinally in a direction perpendicular to the rear axle, the beam defining a first end configured to receive the load, and a second end configured to receive a counter force to the load; and a base defining a fulcrum for the beam, the fulcrum being located between the beam and the floor of the vehicle; a frame member extending longitudinally in a direction non-parallel to the beam. The frame member is located such that the second end of the beam receives a constraining force from the ceiling of the vehicle via the frame member, the constraining force thereby acting as the counter force

DETAILED DESCRIPTION OF EXEMPLARY EMBODIMENTS

Figure 1:
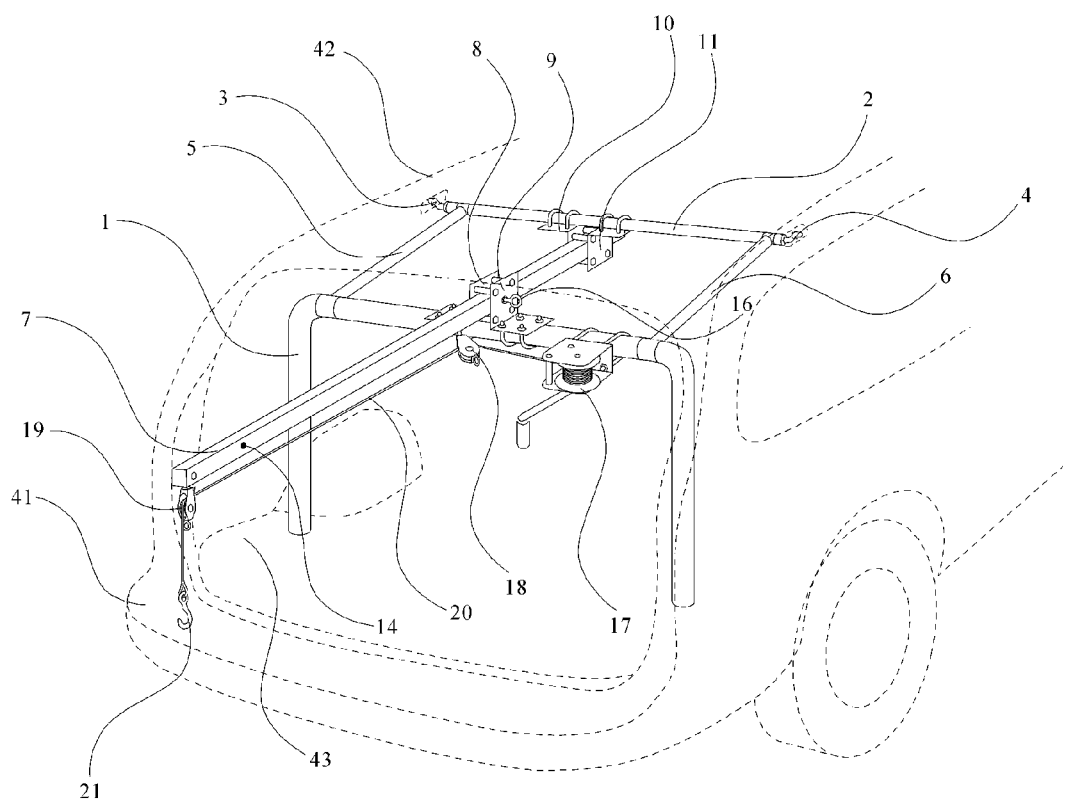
FIG. 1 is a perspective view of a first exemplary system.

FIG. 1 shows the entire configuration diagram of a first exemplary embodiment. The main frame 1 is an arch-shaped structural object composed of a beam and pillars with width and height measured to the interior dimension of the vehicle, formed by bending a round or square, stainless steel or steel pipe, or pipes joined together using joint clamps.

Sub frame 2 is formed from a round or square, steel or stainless steel or steel pipe, and stretched across the vehicle's ceiling sideways so it acts as a beam on the ceiling. If there are accessory mounts in the vehicle, sub frame mounting clasps 3, 4 that fit the mounts are attached to both ends of the sub frame are used to fix the sub frame in position.

Both ends of the beams of the main frame 1 and sub frame 2 are joined by 2 arms 5, 6 to maintain constant spacing. The crane arm 7 is set between the upper middle part of the main frame 1 and the bottom middle part of the sub frame 2, then L-shaped brackets 8, 9 and 10, 11 sandwich the crane arm and are attached to the main frame 1 and sub frame 2.

The first exemplary system includes a rigid-structured frame made from 2 pillars installed near the cargo hatch door at the rear of the vehicle and a beam that connects the pillars together. A sub frame 2 acts as a beam on the ceiling at the front of the vehicle. Two arms connect the main frame and the sub frame 2 together. A crane arm 7 supported by the beams of the main frame 1 and the sub frame 2 can be pulled out and pushed into the vehicle. A winch 17, manual or electronic, attached anywhere on the crane arm or main frame, enables loading and unloading of cargo by winding and unwinding the wire rope and pushing and pulling the crane arm in or out.

When a load is applied on the crane arm 7, the load is applied on the main frame 1 downwards to the floor 43 of the vehicle and the load is applied on the sub frame 2 upwards to the ceiling 42 due to rotational momentum. Thus, the floor 43 exerts a constraint force (reaction force) up, while the ceiling 42 exerts a constraint force (reaction force) down.

The crane fits in between the floor 43 and the ceiling 42. Since load 44 is barely applied against the main frame and sub frame in a front-back direction, loading and unloading of cargo is facilitated, even without having to bolt the pillars of the main frame down to the floor.

When the crane arm 7 is pushed into the vehicle and load is not applied, downward force is applied to the beam of the sub arm 2 from the weight of the crane arm itself, and will collapse forwards if the crane 7 is not attached anywhere. For this reason, it can be advantageous to attach the sub frame 2 to accessory mounts if the vehicle is equipped with one, as shown in the first exemplary system of FIG. 1 or to insert supplementary pillars under the sub frame 2 if there are no accessory mounts, as shown in the second exemplary system of FIG. 3 and plates 37 and 38 can be attached to the pillars of the main frame to prevent the crane from collapsing.

An electrical or manual winch 17 is attached to the beam of the main frame 1. Pulleys 18 and 19 line the wire rope 20 along the pipe to prevent the load from being applied in an oblique angle to the crane arm and the main frame. A hoisting clamp 21 for hoisting the cargo is attached to the tip of the wire rope 20.

Figure 2:
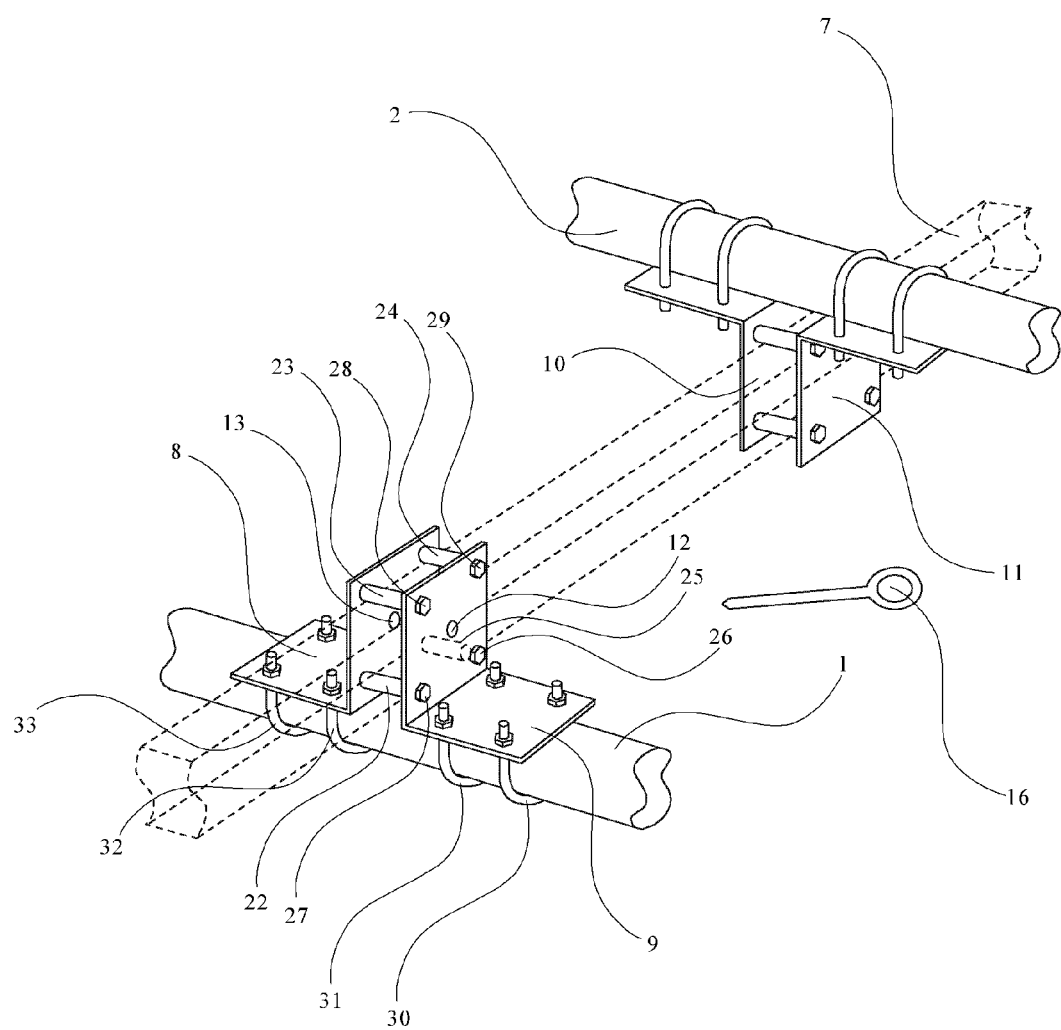
FIG. 2 is the enlarged view of an L-shaped bracket section shown in FIG. 1.

FIG. 2 shows the enlarged diagram of L-shaped brackets 8, 9 and 10, 11 with the crane arm 7 attached. Rollers 22, 23, 24, 25 which act as spacers are sandwiched between the L-shaped brackets 8, 9 and 10, 11 and attached to the top, bottom, left and right of the crane arm 7 using bolts 26, 27, 28, 29, to smoothen the movement when the crane arm is pushed in and pulled out.

Figure 4:
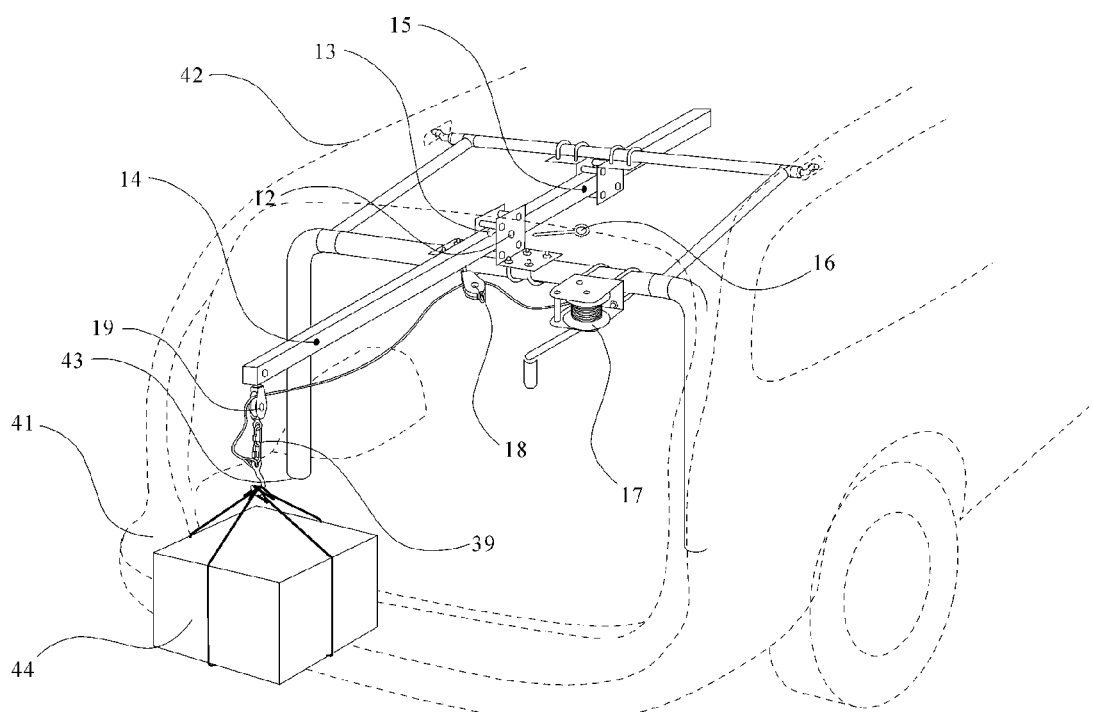
FIG. 4 is a perspective view of the crane in the process of loading and unloading cargo.

The crane arm can be locked when raising and lowering cargo, by aligning the holes for the fixing pin 12, 13 found in the middle of L-shaped brackets 8, 9 on the side that sandwiches the crane arm attached on the main frame 1, with holes for fixing the crane arm 14, 15 see FIG. 4 found in positions where the crane arm is fully pulled out and fully pushed in, and inserting a fixing pin 16.

L-shaped brackets 8, 9 which sandwich the crane arm 7 are attached to the main frame 1 using U-shaped bolts 30, 31, 32, 33.

L-shaped brackets 10, 11 which sandwich the crane arm 7 are attached to the sub frame 2 also in the same way, facing downwards.

Figure 3:
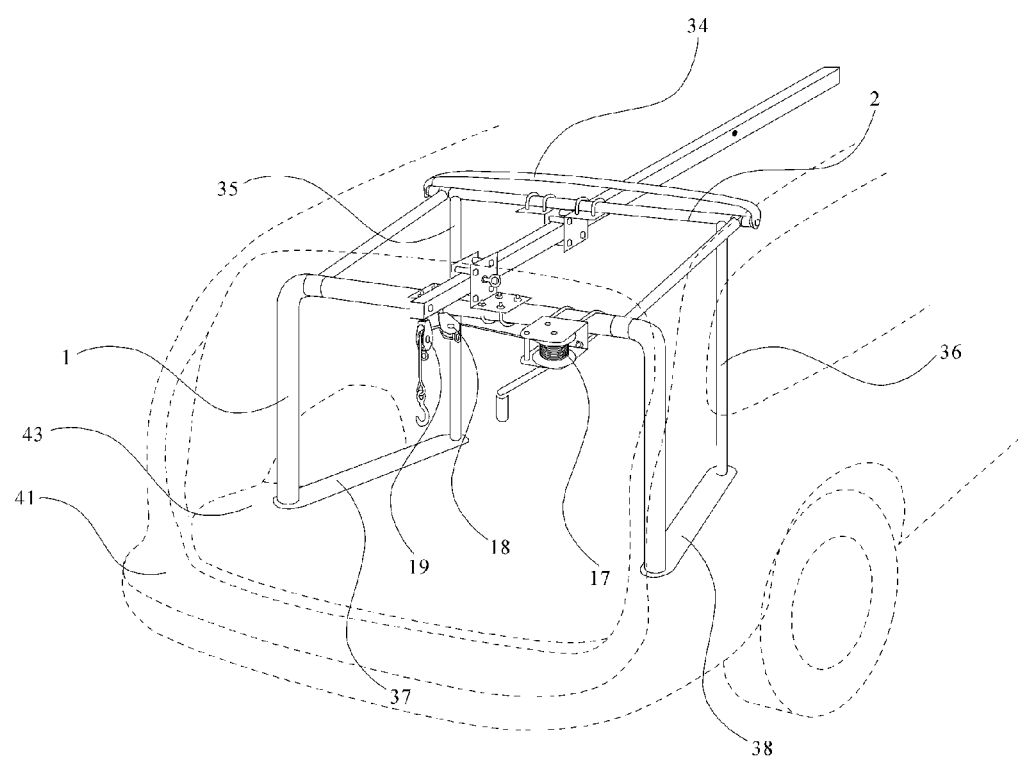
FIG. 3 is a perspective view of a second exemplary system using collapse prevention pillars and plates when accessory mounts are not available.

FIG. 3 shows the example diagram of using collapse prevention pillars 35, 36 and collapse prevention plates 37, 38 when accessory mounts are not available. When there are no accessory mounts to fix the sub frame 2 to the vehicle, a metal plate 34 bent to fit the shape of the vehicle's ceiling is installed to disperse the load when cargo is hauled. Plate 34 is shaped to form a conformal contact with the ceiling, meaning that plate 34 and ceiling initially contact over a finite area. For example, plate 34 may have a convex surface that contacts with a concave surface of the ceiling.

Plate 34 and ceiling are subjected to a pressure over the area where they are in contact.

Collapse prevention pillars 35, 36 are inserted under the sub frame 2 and collapse prevention plates 37, 38 are attached to the pillars of the main frame 1 to prevent the crane from collapsing when the crane arm 7 is stored inside the vehicle and no load is applied.

The system shown in FIG. 3 offers an in-car crane product or assembly kit capable of installing in vans and station wagons with a cargo hatch door without having to make modifications such as bolting to the body of the vehicle, enabling loading and unloading of cargo by oneself, safely.

Thus, the exemplary systems provide a crane arm supported by the beams of the main frame and the sub frame that can be pulled out and pushed into the vehicle, and a winch, manual or electronic, attached anywhere on the crane arm or main frame, it enables loading and unloading of cargo by winding and unwinding the wire rope and pushing and pulling the crane arm in or out.

FIG. 4 is the diagram of the crane in the process of loading and unloading cargo. The cargo is once secured to the pulley 19 of the crane arm 7 using a hoisting clamp 39 to prevent the cargo from dropping when wire rope 20 of the winch 17 is loosened. When loading cargo into the vehicle, push the crane arm 7 into the vehicle in this state until the holes for fixing the crane arm 14 align with the holes for the fixing pin 12, 13 on the L-shaped bracket 8, 9, lock the crane arm by inserting a fixing pin 16, then release the hoisting clamp 39 and loosen the wire rope 20 to unload the cargo.

When unloading cargo from the vehicle, pull the crane arm 7 in this state until the holes for fixing the crane arm 15 align with the holes for the fixing pin 12, 13, lock the crane arm by inserting a fixing pin 16, then release the hoisting clamp 39 and loosen the wire rope 20 to unload the cargo.

Figure 5:
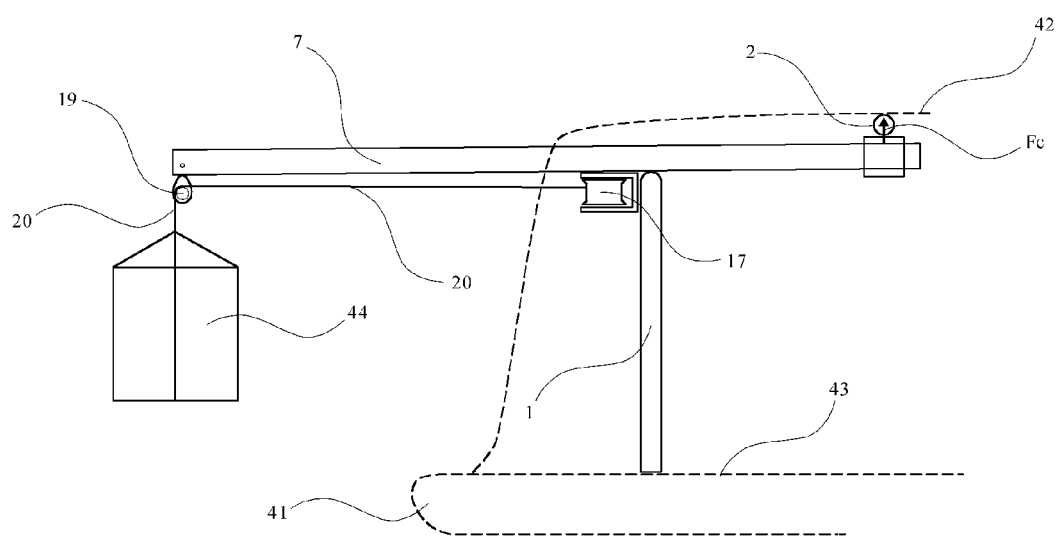
FIG. 5 is a side view emphasizing other aspects of an exemplary system and method.
Figure 6:
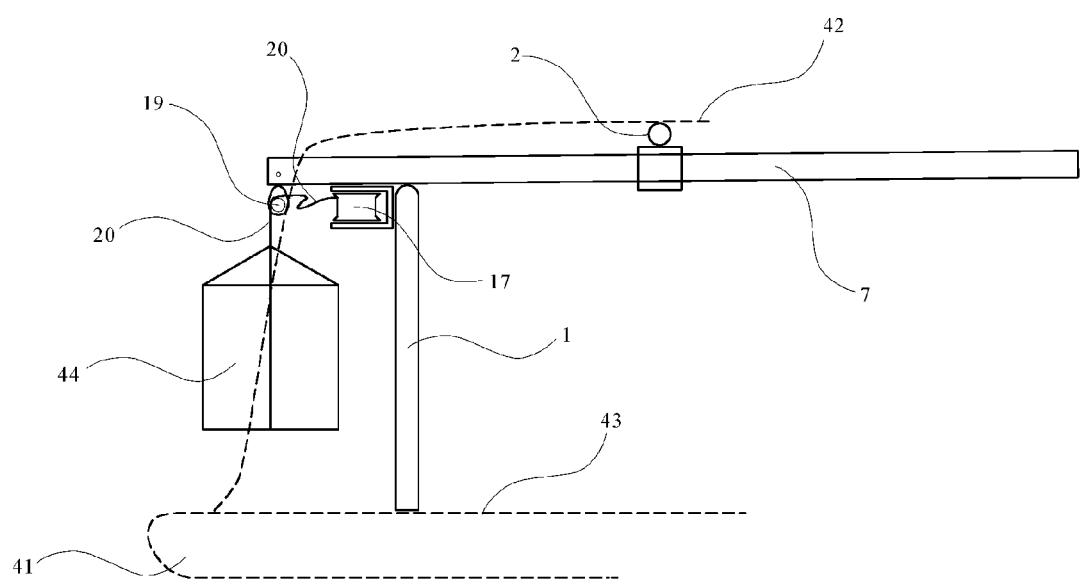
FIG. 6 is another side view emphasizing the system and method at a time subsequent to that depicted in FIG. 5.

FIG. 5 shows a side view of other aspects of an exemplary system and method. Winch 17 applies a tension to cord 20 to suspend load 44. Cord 20 suspends load 44 at a position such that load 44 is horizontally displaced from vehicle 41. Frame 1 acts as a fulcrum for crane arm (beam) 7, such that the weight of load 44 clauses a force Fc, as shown by an arrow in FIG. 5, to be exerted against vehicle ceiling 42. Vehicle ceiling 42 exerts a constraining force that balances force Fc. The force Fc is applied via beam 7 via frame 2, such that the force Fc is applied at a position horizontally displaced from frame 1.

Subsequently, with load 44 suspended, the operator fixes load 44 relative to beam 7, by using clamp 39, and the operator slides beam 7 into vehicle 41 such that load 44 is in horizontal alignment with vehicle 41.

List of Reference Numbers
1 Main Frame
2 Sub Frame
3 Sub Frame Mounting Clasp
4 Sub Frame Mounting Clasp
5 Arm
6 Arm
7 Crane Arm
8 L-Shaped Bracket
9 L-Shaped Bracket
10 L-Shaped Bracket
11 L-Shaped Bracket
12 Holes for the Fixing Pin
13 Holes for the Fixing Pin
14 Holes for Fixing the Crane Arm
15 Holes for Fixing the Crane Arm
16 Fixing Pin
17 Winch
18 Pulley
19 Pulley
20 Wire Rope
21 Hoisting Clamp
22 Roller
23 Roller
24 Roller
25 Roller
26 Bolt
27 Bolt
28 Bolt
29 Bolt
30 U-Shaped Bolt
31 U-Shaped Bolt
32 U-Shaped Bolt
33 U-Shaped Bolt
34 Metal Plate
35 Collapse Prevention Pillar
36 Collapse Prevention Pillar
37 Collapse Prevention Plate
38 Collapse Prevention Plate
39 Hoisting Clamp
41 Vehicle
42 Vehicle ceiling
43 Vehicle force
44 Load Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described.

For example, lengths of the main frame, the sub frame, the arm and the crane arm are adjustable to fit the dimensions of the vehicle regardless of automakers and models, to allow installation inside any vans and station wagons with a cargo hatch door at the rear of the vehicle with a roof.

The parts of the crane are made to be assembled using nuts and bolts to allow installation inside vehicles, and disassembled and stored away when not in use. The crane can also be provided as a fully assembled product or as an assembly kit.

The crane can be installed inside vans and station wagons with a cargo hatch door and a roof without having to make any modifications to the body of the vehicle, enabling loading and unloading of cargo by one person, safely.

For example, when using the crane to load and unload electrical wheelchairs, etc., the user of the wheelchair can load and unload the electrical wheelchair at the vehicle destination, thus broadening one's range of activity, and rehabilitation and contribution to society of elderly people and physically challenged people.

Thus, departures may be made from such details without departing from the spirit or the scope of Applicants' general inventive concept. The invention is defined in the following claims. In general, the words "first," "second," etc., employed in the claims do not necessarily denote an order.

What is claimed is:

1. A system configured to place a load in a motor vehicle, the motor vehicle including a floor, a ceiling, a rear axle, and wheels linked to each other via the rear axle, the system comprising:

a beam extending longitudinally in a direction perpendicular to the rear axle, the beam defining a first end configured to receive the load, and a second end configured to receive a counter force to the load; and a base defining a fulcrum for the beam, the fulcrum being located between the beam and the floor of the vehicle, and no part of the fulcrum being located between the beam and the ceiling of the vehicle;

a frame member extending longitudinally in a direction non-parallel to the beam, the frame member being located such that the second end of the beam receives a constraining force from the ceiling of the vehicle via the frame member, the constraining force thereby acting as the counter force.

2. The system of claim 1 wherein the base includes a main frame made from two pillars configured to be installed near a cargo hatch door at the rear of the vehicle.

3. The system of claim 1 further including
two arms connecting the base and frame member together; and
a winch to enable levitation of the load by winding.

4. The system of claim 1 further including a support configured to suspend the frame member from the ceiling.

5. The system of claim 1 further including a support configured to bear a weight of the frame member from the floor.

6. The system of claim 1 wherein the frame member includes a convex surface extending longitudinally in the direction non-parallel to the beam, the convex surface being configured to contact a concave surface of the ceiling.

7. The system of claim 1 wherein the base is not bolted to the floor of the vehicle.

8. The system of claim 1 wherein the system is not bolted to a body of the vehicle.

* * * * *